US011235259B2

(12) United States Patent
Balde et al.

(10) Patent No.: US 11,235,259 B2
(45) Date of Patent: Feb. 1, 2022

(54) DEVICE FOR PRODUCING SPRAY-DRIED AGGLOMERATES

(71) Applicant: Symrise AG, Holzminden (DE)

(72) Inventors: Alexander Balde, Stadtoldendorf (DE); Alexander Diring, Holzminden (DE); Eric Gruber, Holzminden (DE); Marc Hoffmann, Eschershausen (DE); Alexander Silbernagel, Beverungen (DE); Viktor Vorrat, Holzminden (DE); Jenny Weißbrodt, Holzminden (DE)

(73) Assignee: Symrise AG, Holzminden (DE)

( * ) Notice: Subject to any disclaimer, the term of this patent is extended or adjusted under 35 U.S.C. 154(b) by 566 days.

(21) Appl. No.: 15/164,294

(22) Filed: May 25, 2016

(65) Prior Publication Data

US 2016/0353794 A1     Dec. 8, 2016

(30) Foreign Application Priority Data

May 29, 2015  (EP) .................................... 15169999

(51) Int. Cl.

| B01D 1/18 | (2006.01) |
| A23P 10/22 | (2016.01) |
| A23P 10/40 | (2016.01) |
| B01J 2/04 | (2006.01) |
| A23L 27/00 | (2016.01) |

(52) U.S. Cl.
CPC ................ *B01D 1/18* (2013.01); *A23L 27/70* (2016.08); *A23P 10/22* (2016.08); *A23P 10/40* (2016.08); *B01J 2/04* (2013.01); *A23V 2002/00* (2013.01)

(58) Field of Classification Search
CPC . A23P 10/20; A23P 10/40; A23P 10/22; B01J 2/04; B01J 2/16; B01J 2/28; A23L 27/00; B01D 1/18; A23V 2002/00
See application file for complete search history.

(56) References Cited

U.S. PATENT DOCUMENTS

| 5,044,093 | A |   | 9/1991 | Itoh et al. |
| 5,213,820 | A | * | 5/1993 | Uhlemann ................. B01J 2/16 |
|           |   |   |        | 209/147 |
| 6,711,831 | B1 | * | 3/2004 | Hansen .................... B01D 1/18 |
|           |    |   |        | 34/372 |

FOREIGN PATENT DOCUMENTS

| DE | 43 04 405 A1 | 8/1994 |
| DE | 195 45 986 A1 | 6/1997 |
| DE | 199 27 537 A1 | 12/2000 |
| WO | 90/14143 A1 | 11/1990 |
| WO | 96/11580 A1 | 4/1996 |
| WO | 2007/124745 A1 | 11/2007 |
| WO | 2013/011148 A1 | 1/2013 |

* cited by examiner

*Primary Examiner* — Cynthia L Schaller
(74) *Attorney, Agent, or Firm* — Dilworth & Barrese, LLP

(57) ABSTRACT

The invention is in the field of devices for producing particles, in particular large agglomerate particles.

12 Claims, 4 Drawing Sheets

Figure 1

DEVICE FOR PRODUCING SPRAY-DRIED AGGLOMERATES

FIELD OF THE INVENTION

The invention is in the field of devices for producing particles, in particular large agglomerate particles.

PRIOR ART

Large particles are an important product for use in the foodstuff sector. For example, flavourings in particle form are added to the food, for example in teabags to round off the taste profile. Large particles, in the form of large agglomerate particles, are mostly obtainable by methods which are expensive in production or which only allow relatively low loads up to about 6%.

Spray drying represents a common method for producing particles in the food sector, said method additionally allowing a high load of the dried particles of up to 30%. A disadvantage of spray drying is the limited particle size, which varies within the range of about 70-100 µm.

By means of spray-bed drying, it is, for example, possible to generate larger particles; however, the limit thereof is about 200 µm. If larger particles are produced using this method, they are generally mechanically unstable and do not withstand mixing processes, transport and dispensing without great abrasion and thus formation of fine dust.

Particles which are greater than 200 µm in size and which have a sufficient mechanical stability could replace the spray-granulated particles that are expensive to produce or particles with only a low load that are produced by hot-melt extrusion, or usefully complement the range of particles for new markets and products.

It is therefore an object of the present invention to develop a device which makes it possible to produce large, stable agglomerate particles which are larger than 200 µm, preferably larger than 300 µm, preferably agglomerate particles with an order of magnitude of around 600 µm or even larger. It is intended that the device be operated as economically as possible and that the process be designed such that the obtainable agglomerate particles have an improved product quality. It is especially intended that the large agglomerate particles from the process have a good load of active substances, preferably flavourings, and be stable. More particularly, it is intended that the active substances, which are preferably flavourings, remain stable in the particle before use. It is intended that the device be designed such that production yields agglomerate particles that are as low in dust as possible.

SUMMARY OF THE INVENTION

The invention accordingly provides a device for the spray-drying agglomeration of particles, where the device
(i) has a spray-drying segment (A) in the upper region of a chamber for drying feed liquid particles sprayed by a feed liquid atomizer (Z1),
(ii) comprises an integrated fluidized bed (B) in the lower region of a chamber, in which region the powder of the spray-drying segment from step (i) is sprayed with a binder liquid by means of a nozzle or atomizer construction (Z2) mounted at the bottom of the fluidized bed,
the particles being constantly kept in motion and whirled up during production.

Instead of realizing the agglomeration by a recirculation of powder into the process, an agglomeration is achieved exclusively in the fluidized bed by the additional feeding-in of suitable binder liquids. It was found that, surprisingly, the agglomerate particles thus produced become especially large. Moreover, it became apparent that the integration of a nozzle or atomizer construction (Z2) mounted at the bottom of the fluidized bed (B) is especially advantageous for spraying the binder liquid. Moreover, it became apparent that the constant circulation promotes the probability of particle collision such that large agglomerate particles arise within a short period.

BRIEF DESCRIPTION OF THE DRAWINGS

The invention is additionally illustrated by the following FIGS. 1 to 5:

FIG. 1: Agglomeration spray-drying device,

DESCRIPTION OF THE INVENTION

In a preferred embodiment, the nozzle or atomizer construction (Z2) in the internal fluidized bed (B) consists of an arrangement composed of multiple individually arranged nozzles which are all each individually connected to a feed line from which binder liquid or any possible liquid required in the agglomeration process is sprayed. Moreover, the feed line makes it possible for each nozzle to be individually provided with any liquid to be sprayed, and so, depending on which agglomerate particles are required, the composition can be appropriately produced. The number of nozzles can be altered from 1 up to 12 nozzles depending on the size of the spray tower and on the product or the product quality to be achieved. The nozzles can be individually adjusted such that droplet distributions of the sprayed binder liquid from a very fine mist right up to relatively large drops are achieved. This is achieved by varying the cap setting on the nozzles and varying the atomization pressure from 1-6 bar.

In particular, in a preferred embodiment, the nozzle or atomizer construction (Z2) in the internal fluidized bed (B) consists of a ring line, along which nozzles or atomizers are evenly spaced. Such a construction is depicted by way of example in FIG. 4.

In a further preferred embodiment, the nozzle or atomizer construction (Z2) is a concentric ring line or a latticed construction having nozzles or atomizers. An important aspect is the uniformity of the mounted nozzles or atomizers. In the case of the presently described nozzle or atomizer construction (Z2), the nozzles or atomizers can be individually regulated; thus, it is, for example, possible for nozzle or atomizer pressure to be individually regulated and adjusted.

This construction has the advantage that the particles circulating in the fluidized bed can be wetted with a large amount of moisture. Moreover, such a design of the nozzle or atomizer construction (Z2) in the internal fluidized bed (B) supports fluidization, and this is an advantage for obtaining large agglomerate particles.

Figure 4:
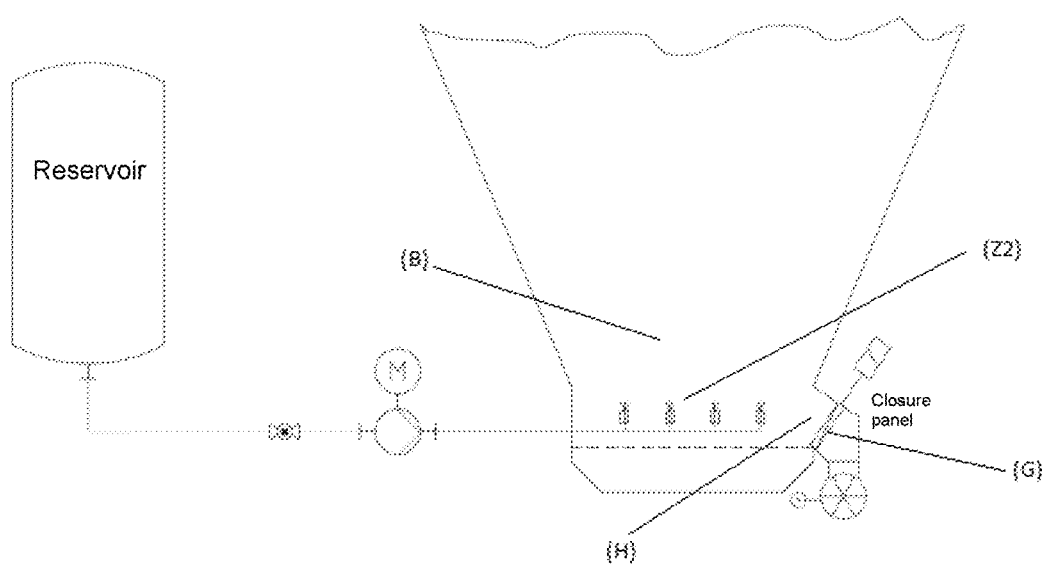
FIG. 4: Device having nozzle or atomizer construction (Z2) and dam (closure panel) (G) in the fluidized bed (B)
Figure 5:
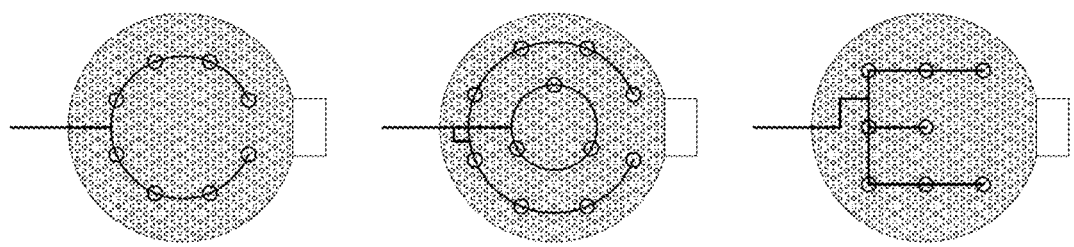
FIG. 5: Arrangement of the nozzle or atomizer construction (Z2).

In a further preferred embodiment, the nozzle or atomizer construction (Z2) comprises at least 1 or 2 or 3 nozzles or atomizers, the nozzles or atomizers preferably being arranged as described above and being depicted by way of example in FIG. 4.

In a further preferred embodiment, the nozzle or atomizer construction (Z2) comprises at least 4 nozzles or atomizers, the nozzles or atomizers preferably being arranged as described above and being depicted by way of example in FIG. 4.

The amount of binder liquid which can act on a particle as a result of the thus constructed nozzles or nozzle number allows an optimal uptake of moisture by the particles. The particles adsorb the liquid better as a result. Owing to the process control, more particularly the temperature and air velocity in the fluidized bed, the surfaces of the particles dry only very slowly, i.e. remain tacky for a long period. The enlarged adhesive surfaces thus obtained lead to an enhanced agglomeration of the fluidized particles in comparison with conventional processes. This gives rise to very large agglomerate particles which, owing to the enlarged adhesive surfaces, also have an increased mechanical stability.

The contact area of the circulating particles in relation to one another is thereby further enlarged, and thus leads to an enlargement of the contact areas of the particles, and so large agglomerate particles are rapidly formed.

In a further preferred embodiment, the nozzle or atomizer construction (Z2) is constructed such that the binder liquid from the nozzle or atomizer construction (Z2) in the internal fluidized bed (B) is sprayed from the bottom to the top.

The construction of the nozzles or atomizers in the device according to the invention supports in particular the upward flow of the particles in the fluidized bed and thus also the distribution of the particles in the fluidized bed, which leads to the fluidized bed not collapsing once the particles reach a size of above 200 µm. In particular, the circulation which constantly keeps the particles in motion allows a large probability of collision amongst the particles.

In a further preferred embodiment, the nozzles or atomizers in the nozzle or atomizer construction (Z2) are pressure-spray nozzles; preferably, they are twin-fluid spray nozzles. The atomization in the fluidized bed is preferably effected by two-substance nozzles. Two-substance nozzles offer the advantage that they clean themselves because of the atomization pressure. Therefore, they do not clog during production, which could easily happen in the fluidized bed filled with product. Preferably, pressure nozzles are used with turbulence bodies. Preferably, the nozzles or atomizers have a bore diameter ø of from 0.5 to 1.5 mm, preferably from 0.7 to 1.0 mm. Twin-fluid spray nozzles are especially advantageous, since they make it possible for two different liquids and/or gases to be blown through the nozzles or to be blown into the fluidized bed. Accordingly, twin-fluid nozzles are preferably used, since the air introduced by the twin-fluid nozzles promotes the upward flow of the particles.

The nozzles (Z2) situated in the fluidized bed (B) are individually provided with pressurized air, which is regulated in each case by means of a pressure reducer (regulated range of 0-10 bar). The product and pressurized-air lines preferably consist of stainless steel and are earthed to ensure safe operation.

The binder is fed into the fluidized bed preferably at 10-100 litres/h at 1-10 bar, preferably at 20-80 litres/h at from 1 to 8 bar.

The interplay between the circulation of the particles and the use of the nozzle or atomizer construction (Z2) allows, firstly, a large probability of collision amongst the particles and, at the same time, it enlarges the adhesive contact areas of the particles, making it possible to yield large stable agglomerate particles.

Owing to the construction and control of the nozzles or atomizers, the agglomerate particles obtainable according to the invention have a compact stable structure and, accordingly, low dust values and abrasion values.

In a further preferred embodiment, the device according to the invention comprises a dam construction (G), which is likewise fitted in the fluidized bed (B) and which is placed in front of the escape opening (H) to the zigzag classifier or the external fluidized bed. The dam serves to adjust the fill level of the fluidized bed and to regularly discharge the particles and to adjust the residence time of the particles in the fluidized bed. Accordingly, the dam construction in the device according to the invention assumes the role of an air classifier (air classification). Air classification is a mechanical separation method in which particles are separated in a gas stream on the basis of their ratio of inertial or gravitational force to the flow resistance. It is a classification method (separation method in process engineering) and makes use of the principle of separation by gravitational force or centrifugal force. Fine particles follow the flow, and coarse ones follow inertial force.

The dam construction in front of the output opening to the zigzag classifier or an external fluidized bed has the advantage that, firstly, it is possible to regulate the fill level in the fluidized bed, and hence the residence time and thus the particle size, and, secondly, a portion of the particles is immediately returned to the headspace of the spray dryer. Thus, they pass through the entire process once again. In the headspace, the spraying takes place with the slurry, leading to a first agglomeration, and, below in the fluidized bed, the particles are further agglomerated, resulting in the agglomeration being promoted and the size of the agglomerate particles being influenced here once more.

The dam construction additionally serves to regulate the amount of product in the fluidized bed, ensuring that a sufficient amount of particles is present in the fluidized bed so that an agglomeration can also take place. This in turn occurs owing to an amount of introduced binder liquid corresponding to the amount of particles, resulting in the prevention of the formation of clumps. Furthermore, owing to the dam, it is possible to prevent the presence of too much product in the fluidized bed, such that said bed can no longer be fluidized.

In a further preferred embodiment of the device according to the invention, the fine dust in the device that arises as a result of abrasion during spray drying and agglomeration is returned to the headspace of the spray tower by means of the zigzag classifier or an external fluidized bed.

The recirculation of the fine dust into the process has the advantage that the loss of yield is minimized and also the reduction of fine dust in the process. In addition, it has the advantage that the risk of a dust explosion is reduced or minimized too.

In a further preferred embodiment of the device according to the invention, the input temperature at the feed atomizer (Z1) is between 100° C. to 220° C. and the output temperature at the zigzag classifier (P) is from 20° C. to 100° C., with the slurry throughput being within the range of 300 to 1200 kg/hour, and being atomized at 30 to 200 bar. Preferably, the input temperature is 190-200° C. and the output temperature is 80-20 C. or, in the case of volatile constituents, the input temperature is from 100-130° C. and the output temperature is from 50-70° C. The temperature settings are presented here only by way of example and are adjusted accordingly depending on the components.

In a further preferred embodiment of the device according to the invention, the temperature in the fluidized bed during agglomeration is between 5-90° C.

The agglomerate particles obtainable by the method according to the invention are larger than 200 μm. Preferably, the agglomerate particles obtainable by the method according to the invention are larger than 300 μm and can become up to 1000 μm in size. Preferably, agglomerate particles according to the invention are between 300 μm and 800 μm, preferably between 400 μm and 700 μm, in size. However, the size of the agglomeration particles is varied according to the application area, and so the agglomeration particle sizes stated here are not intended to represent a restriction, but merely represent an exemplary implementation of possible agglomerate sizes.

The production of the agglomerate particles by means of the device according to the invention is typically subject to the process parameters, such as temperature, pressure, flow, etc. Ideally, stable large agglomerate particles having good bulk weights, flowability values and low dust values can be produced by adjusting the above-mentioned temperatures. Accordingly, the parameters adjusted for the production of agglomerate particles can vary depending on the agglomerate required, and so the above parameters are guideline values which are not intended to be restrictive.

It is especially important here in the production of large agglomerate particles that the air in the internal fluidized bed has to be adjusted such that the particles fluidize and have a uniform distribution in the bed. Therefore, the nozzle or atomizer construction (Z2) is an important aspect. Similarly, the regulation of the amount of product in the fluidized bed is an essential aspect which influences the production of large particles. Furthermore, the temperatures at the input and output of the fluidized bed must be regulated such that an agglomeration is possible, i.e. preferably at temperatures which are not excessively hot, so that the binder does not directly dry and thus the particles cannot stick together, and also temperatures which are not excessively cold, since the product otherwise becomes wet and the particles would clump and the fluidized bed would collapse (wet operation).

The present invention further provides for the use of agglomerate particles which are produced by the device of the invention for the production of foodstuff or food products.

Furthermore, a further aspect of the invention is the use of agglomerate particles produced by the device according to the invention as flavouring particles, preferably for the flavouring of foodstuff or food products.

The term "food" or "foodstuff" encompasses in particular products which are food in accordance with REGULATION (EC) No. 178/2002 OF THE EUROPEAN PARLIAMENT AND OF THE COUNCIL of 28 Jan. 2002. According to said regulation, "food" means any substance or product, whether processed, partially processed or unprocessed, intended to be, or reasonably expected to be ingested by humans.

The present invention further provides for the use of the agglomerate particles obtainable according to the invention for producing foodstuff or food products.

The agglomerate particles obtainable according to the invention are preferably intermediate products and can be used in end products in the food sector, preferably as flavouring agglomerate particles. Preferably, the food is, for example, baked goods, for example bread, dry biscuits, cake, other pastry, long-life baked goods or snacks such as, for example, crackers, lye roll, biscuits, potato crisps or corn chips (e.g. tortilla chips), wheat flour products (e.g. pastry sticks, croutons, bread chips, rusk, extruded and non-extruded crispbreads), confectionery (for example chocolates, chocolate bar products, other bar products, fruit gum, hard and soft caramels, chewing gum), alcoholic or non-alcoholic drinks (for example coffee, tea, iced tea, wine, wine-containing drinks, beer, beer-containing drinks, liqueurs, schnapps, brandies, (carbonated) fruit-containing soft drinks, (carbonated) isotonic drinks, (carbonated) soft drinks, juice drinks, alcoholic and non-alcoholic spritzers, fruit and vegetable juices, fruit or vegetable juice preparations, "instant" products, such as instant drinks (for example instant cocoa drinks, instant tea drinks, instant coffee drinks, instant fruit drinks), meat products (for example ham, cooked sausage or uncooked sausage preparations, seasoned or marinated fresh meat or salt meat products), eggs or egg products (dried egg, egg white, egg yolk), cereal products (for example breakfast cereals, muesli bars, pre-cooked ready rice products), milk products (for example milk drinks, buttermilk drinks, ice cream, yoghurt, kefir, cream cheese, soft cheese, hard cheese, powdered milk, whey, whey drinks, butter, buttermilk, products containing partially or fully hydrolysed milk protein), products composed of soya protein or other soya bean fractions (for example soya milk and products made therefrom, fruit drinks containing soya protein, soya lecithin-containing preparations, fermented products such as tofu or tempeh or products made therefrom), products composed of other plant protein sources, for example oat protein drinks, fruit preparations (for example jams, sorbet, fruit sauces, fruit fillings), vegetable preparations (for example ketchup, sauces, dried vegetables, frozen vegetables, pre-cooked vegetables, bottled vegetables), snack articles (for example baked or fried potato crisps or potato dough products, corn- or peanut-based extrudates), fat- and oil-based products or emulsions thereof (for example mayonnaise, tartar sauce, dressings), other ready meals and soups (for example dried soups, instant soups, pre-cooked soups), spices, spice mixtures and especially seasonings which are, for example, used in the snack sector.

EXAMPLES

EXAMPLES OF PRODUCTION

Production of Agglomerate Particles

Agglomerate particles loaded with flavouring are produced. To this end, primary particles are produced in the upper chamber of the apparatus by means of spray drying, which particles are then sprayed with binder liquid in the lower part of the apparatus. Here, it is ensured that a sufficient amount of primary particles is constantly supplied to the fluidized bed in order to sustain the process.

The input air in the tower is 160-200° C. The temperature in the fluidized bed is restricted to 30-50° C., so that the primary particles have sufficient time to agglomerate as a result of the sprayed dispersion. Here, excessively high temperatures would lead to high drying rates and, as a result, the sprayed dispersion could dry on the particle surfaces before agglomeration has taken place.

The process is otherwise started under standard conditions until the fluidized bed has been filled up to a tower-specific level. This is achieved by the dam being initially closed. This is followed by the feeding of the "binder liquid" into the fluidized bed, and the dam is opened. This suspension can either consist of the slurry itself or—if an additional sealing of the particle surfaces is desired and a high mechanical stability is required—be admixed with low-molecular-weight substances having a good adhesive action such as, for example, dextrose, sorbitol, mannitol, etc. Wetting with water or water vapour is possible too depending on the desired particle properties.

Figure 1:
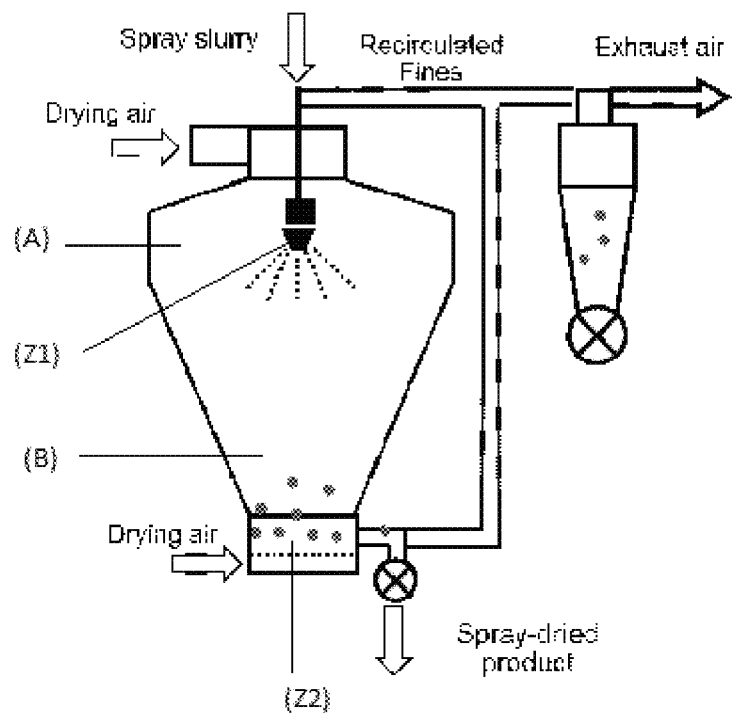

The nozzles from which the binder liquid is sprayed into the bed are small-bore two-substance nozzles which generate an extremely fine spray mist in the fluidized bed. The air streams introduced via said nozzles contribute to the fluidization of the particles and ensure a uniform wetting of the particles and thus a controllable agglomeration without clumps. FIG. 1 clarifies the position of the individual technical device features in an agglomeration spray-drying apparatus for the production of the large agglomerate particles according to the invention.

Effect of the Nozzle or Atomizer Construction on Agglomerate Particles

Agglomerate particles were produced, and the effect of the nozzle or atomizer construction (z) in the internal fluidized bed (b) on the agglomerates was tested. The results can be found in the table below.

TABLE 1

Results with different nozzle or atomizer constructions

| Nozzle or atomizer construction | Atomization pressure in the fluidized bed | Volume flow in the fluidized bed | Observation |
| --- | --- | --- | --- |
| 1 nozzle (test tower) | 0.5-2 bar | 0.5-3 litres/h | Large stable agglomerates |
| 4 nozzles | 3-6 bar | 30-80 litres/h | Stable agglomerates, good distribution in the fluidized bed |
| Ring line having 6-8 nozzles | 3-6 bar | 30-80 litres/h | Large stable agglomerates, uniform atomization in the fluidized bed |
| Double ring line having 3 nozzles in the inner ring and 6 nozzles in the outer ring | 3-6 bar | 30-80 litres/h | Large stable agglomerates, even better distribution |

The lower the pressure, the larger the drops and the less uniform the droplet distribution. This can lead to a more rapid agglomeration. However, there is the risk that the nozzles no longer blow themselves clear at a lower pressure (i.e. they clog), that the density of the particles increases too rapidly and the particles are insufficiently whirled up and the fluidized bed thus collapses. Accordingly, the pressure must be adapted to both the supply of primary particles and the fed-in amount of binder liquid. This optimization must be carried out for each configuration (tower, fluidized bed size, throughput of primary particles, etc.).

Density and Structural Determination of the Agglomerate Particles

I) Particle Size of the Agglomerate Particles

The particle sizes of the agglomerates produced according to the invention were determined by means of a measurement by means of laser diffraction.

The principle of laser diffraction is a distinctly flexible technique, having fundamentally the means of measuring the size of any material in another. The only conditions of the technique are that each phase is optically demarcated from the other and the medium is transparent for the laser wavelengths. This means that the refractive index of material and of the surrounding medium must differ.

The measurement is achieved by introducing the sample into the laser beam by means of the corresponding modules for powders or emulsions/suspensions. The light scattered by the particles is detected. The entire laser output beamed towards the path from this system is measured and also allows the sample concentration to be inferred.

The instrument available here (Malvern Mastersizer 2000 with Scirocco drying unit) provides the means of measuring powders up to a maximum particle size of 2 mm. With said instrument, it is possible to apply a dispersion pressure of from 0 to 4 bar to feed in the powder. However, care should be taken not to destroy the product while this is done, since, at the pressure set, suction is carried out against an impact plate during the feeding-in process.

II) Structural Determination of the Agglomerate Particles

The structure of the agglomerates produced according to the invention was determined on a black sample plate by means of a loupe (from Will, with camera).

For better identification of structures of dried flavourings or composition of applications such as, for example, flavoured tea mixtures, use is made of a loupe. It is possible here to analyse a sample with a magnification between 7- and 45-fold.

Figure 2:
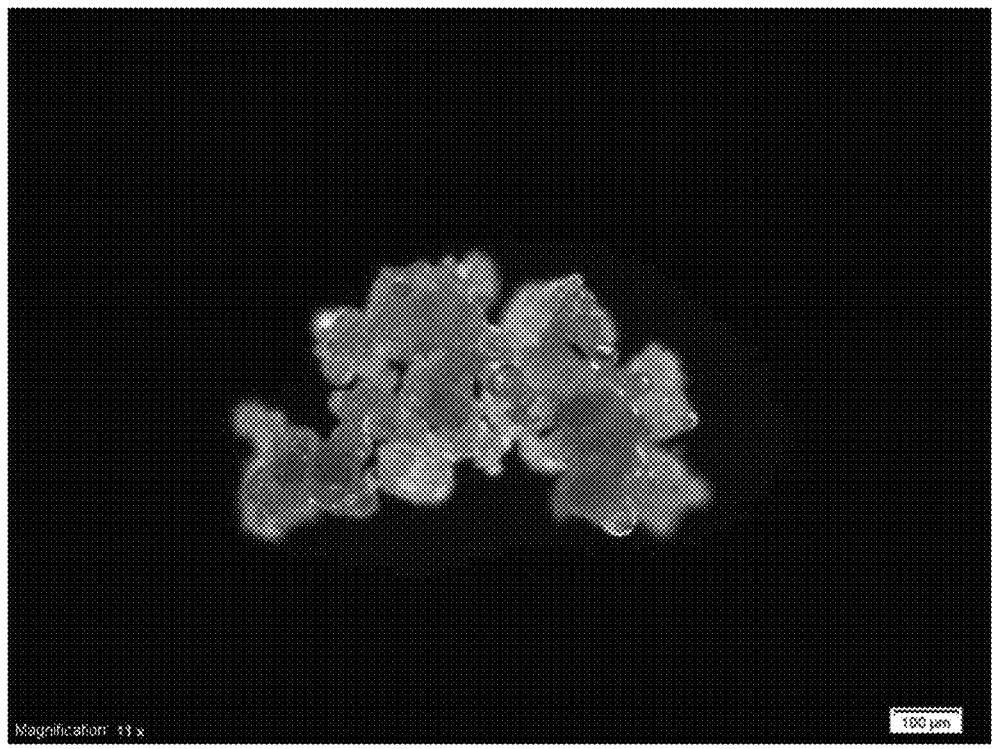
FIG. 2: Agglomerate particle containing mango flavouring: standard (top), inventive (bottom)
Figure 2:
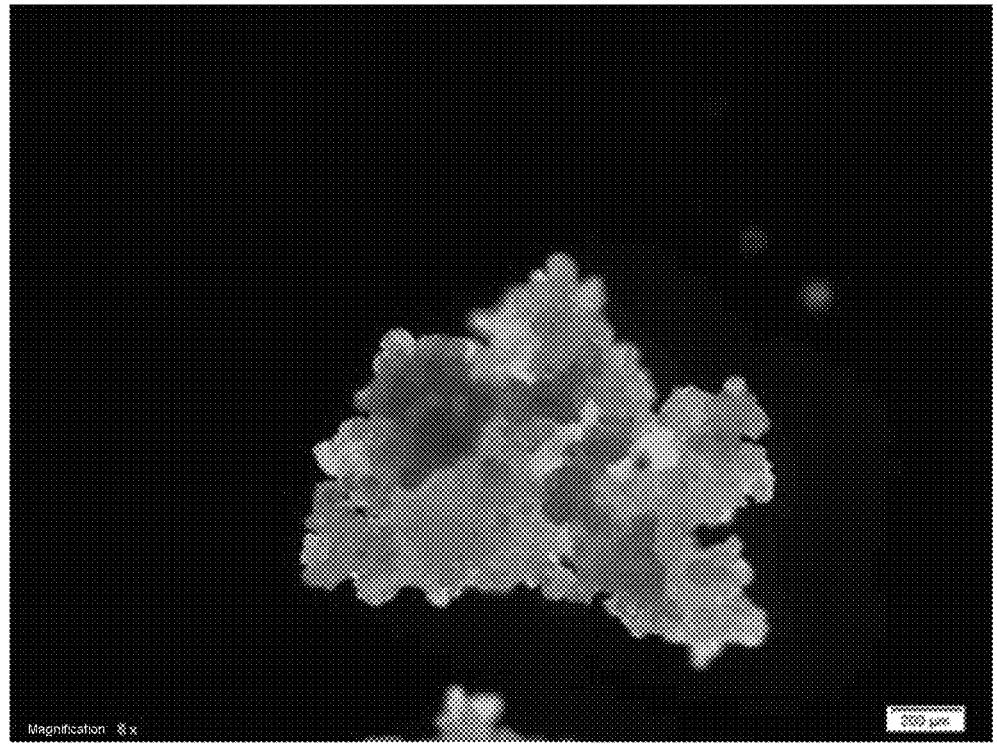
Figure 3:
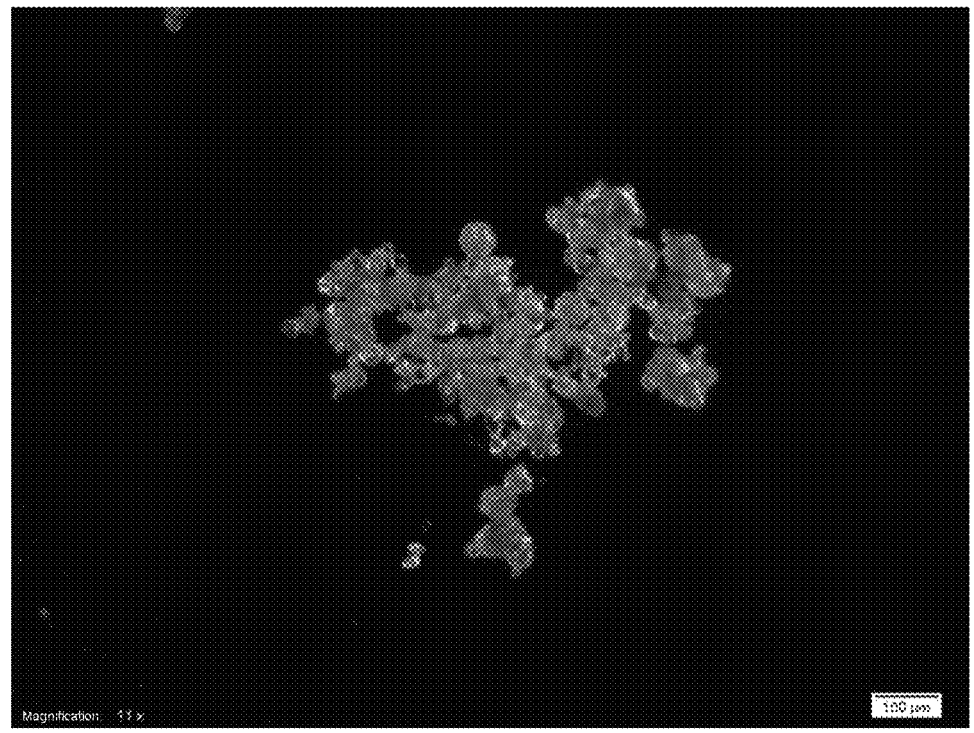
FIG. 3: Agglomerate particle containing chocolate flavouring: standard (top), inventive (bottom)
Figure 3:
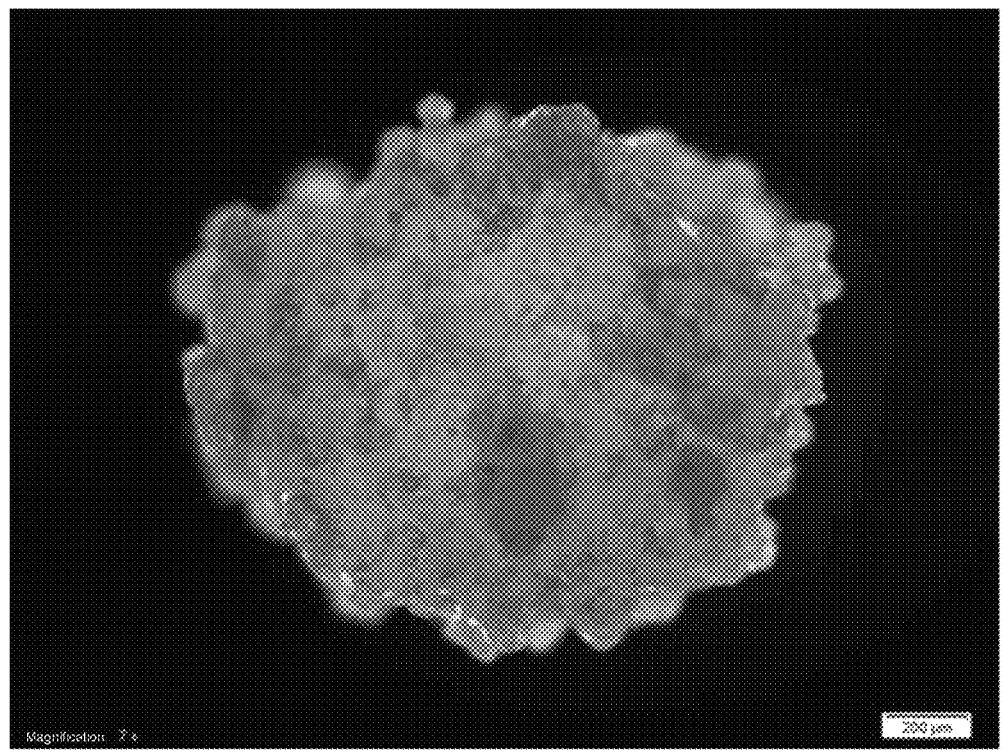

FIG. 2 and FIG. 3 show the agglomerate particles produced according to the invention in comparison with agglomerates produced by the established method. The microscopic images make it clear that the particles produced according to the invention are in some cases more than double the size (about 600 µm and larger) of the standard particles. At the same time, they have a distinctly denser and thus more stable structure.

The results are displayed in Table 1.

Abrasion Resistance of Dry Products

The abrasion test was carried out using a friabilator.

With this analysis method, the mechanical stress to which a product is exposed during transport and further processing is simulated.

As bulk material, the product is subjected to a rotational movement and free fall during the analysis, and so non-stable products break or can be abraded at possible edges. The resulting abrasion is a fine fraction which distorts the actual product or cannot be used for further processing.

The abrasion test using a friabilator was carried out under the following conditions:

| Intensity | Duration | Amount weighed |
| --- | --- | --- |
| Level 3 | 10 min | 50 g |

It can be seen that the particle size is reduced as a result of rubbing for all the samples, even for the mechanically highly stable standard particles. However, it can also be seen that, even after the strong mechanical stress of d(50) µm, the particle produced according to the invention is still within the range of 300-600 µm (see Table 3).

Determination of the Flowability of the Agglomerate Particles

The flowability of the agglomerate particles was determined using a Powder Flow Analyser instrument. This method allows the measurement of the flowability of powders.

To this end, the powder sample is introduced into a cylindrical container. The stirrer, with its inclined stirring blades rotating, is then guided up and down through the sample. This occurs at a defined angle and at a defined speed. From the resistance of the powder, it is then possible to calculate the FFC value, a measure of flowability.

Flowability is an essential criterion for transfer and dispensing processes in production or for the client.

The advantage of this measurement method is the possibility of characterizing even non-free-flowing powders with a value, this not being possible with conventional methods such as angle of repose.

The flowability of the agglomerates was measured as FFC value.

The following FFC scale is applicable:

| 0 < FFC < 11 | free-flowing |
| 11 < FFC < 14 | easy flowing |
| 14 < FFC < 16 | cohesive |
| 16 < FFC < 19 | highly cohesive |
| FFC >19 | hardening |

It can be seen in Table 2 that all the agglomerates produced according to the invention can be classified as free-flowing.

particles remain there, whereas others, as airborne particles, reach the impact zone directly above the base plate. In said impact zone, the light absorbance is measured over a defined period (30 seconds) using a laser light source and a photocell. The absorbance is a measure of the dust behaviour of the sample.

Dust formation plays a major role in, for example, production, since it can lead to cross contamination or else impairment of the health of personnel. In filling processes too, there must be virtually no formation of dust, since it may not otherwise be possible to properly heat-seal packaging or to properly affix labels.

The following dust value scale is applicable:

| 500 | extremely high dust values |
| 150 | very high dust values |
| 30 | normal dust values |
| 5 | low dust values |
| <2 | extremely low dust values |

The agglomerate particles produced according to the invention have extremely low dust values, which would be expected to result in cohesive products according to the above-listed limits. However, in conjunction with the flowability measurements, it can be ruled out that the powders are cohesive; they are merely unusually low in dust. The agglomerates of the comparative particles all have a higher dust value (Table 2).

TABLE 2

Summary of results

| Agglomerate | Load | Density measurement | | | | Dust | Bulk |
| | | d(0.1) µm | d(0.5) µm | d(0.9) µm | FFC | value | weight |
| 1 | Mushroom flavouring E* | 96 | 388 | 952 | 13.6 | 0.61 | 410 g/l |
| 2 | Mango flavouring E* | 127 | 397 | 856 | 10 | 1.85 | 350 g/l |
| 3 | Peach flavouring E* | 177 | 758 | 1443 | 11.2 | 0.08 | 450 g/l |
| 4 | Lemon flavouring E* | 266 | 651 | 1288 | 12.7 | 1.24 | 430 g/l |
| 5 | Lemon flavouring E* | 270 | 509 | 910 | 11.9 | 3.08 | 580 g/l |
| 6 | Raspberry E* | 120 | 418 | 1130 | 8.9 | 1.11 | 480 g/l |
| 7 | Bergamot A | 131 | 362 | 745 | 14 | 34.8 | 460 g/l |
| 8 | Bergamot_V * | 420 | 580 | 799 | 13.3 | 19.3 | 720 g/l |
| 9 | Peach flavouring A | 42 | 146 | 308 | 10 | 20 | 330 g/l |
| 10 | Irish cream_V* | 462 | 633 | 869 | 12.8 | 4.65 | 660 g/l |

Determination of the Dust Values of the Agglomerate Particles

The dust values of the agglomerates produced were determined in accordance with DIN 55992-2 using an SP3 dust measuring instrument according to the drop method.

A defined amount of sample substance is introduced into the feeding system of a vertical downpipe. After sudden opening of the feeding system, the sample drops in the pipe to the base. When the particles hit the base plate, some With the exception of agglomerate 5, which was produced in the production tower in accordance with the device according to the invention, agglomerates 1-4 and 6 were produced in the test tower.

A*=agglomerates produced by means of technology available on the market (spray drying with integrated agglomeration)

V*=most stable agglomerates in comparable sizes, produced according to the method of spray granulation.

TABLE 3

Abrasion test using friabilator

| Agglomerate | | d(0.1) μm | d(0.5) μm | d(0.9) μm |
|---|---|---|---|---|
| 1 | | 96 | 388 | 952 |
| | Abrasion | 84 | 266 | 703 |
| 2 | | 127 | 397 | 856 |
| | Abrasion | 126 | 380 | 788 |
| 3 | | 177 | 758 | 1443 |
| | Abrasion | 156 | 610 | 1316 |
| 4 | | 266 | 651 | 1288 |
| | Abrasion | 147 | 377 | 862 |
| 5 | | 270 | 509 | 910 |
| | Abrasion | 180 | 401 | 747 |
| 6 | | 120 | 418 | 1130 |
| | Abrasion | 104 | 309 | 798 |
| 7 | | 131 | 362 | 745 |
| | Abrasion | 122 | 309 | 629 |
| 8 | | 420 | 580 | 799 |
| | Abrasion | 395 | 536 | 732 |
| 9 | | 42 | 146 | 308 |
| | Abrasion | 42 | 146 | 308 |
| 10 | | 462 | 633 | 869 |
| | Abrasion | 419 | 574 | 782 |

Climatic Test in Climatic Chamber

Dry flavourings are usually based on sugar-containing matrices. Because of their hygroscopicity, they are sensitive to temperature in combination with humidity. However, since these flavourings are frequently exposed to such a physical stress during their processing steps and in applications, they must be tested for their compatibility as early as during the development phase.

For example, a tea mixed with dry flavouring is generally stored in the kitchen only in cardboard packaging and is regularly subjected to relatively high humidity at room temperature during this period. In addition, dry flavourings are sold all over the world and ought, even in other climate zones, to meet a certain minimum quality and stability with respect to the temperatures and humidity prevailing in said zones. It is intended that this situation be simulated by storage in the climatic chamber at an elevated humidity and elevated temperature. The results are displayed in Table 4 below:

TABLE 4

Results of climatic test in climatic chamber

| Agglomerate | Amount weighed 3.0 g Period | | | | | | |
|---|---|---|---|---|---|---|---|
| | 0 h | 5 h | 24 h | 29 h | 48 h | 120 h | 144 h |
| Lemon | 3.0 | 3.0 | 3.0 | 3.0 | 3.0 | 3.01 | 3.01 |
| Lemon V* | 3.0 | 3.02 | 3.08 | 3.09 | 3.1 | 3.11 | 3.11 |
| Bergamot | 3.0 | 3.06 | 3.11 | 3.12 | 3.12 | 3.13 | 3.13 |
| Bergamot V* | 3.0 | 3.01 | 3.03 | 3.03 | 3.03 | 3.03 | 3.03 |
| Cinnamon | 3.0 | 3.0 | 3.0 | 3.0 | 3.0 | 3.0 | 3.0 |
| Cinnamon V* | 3.0 | 3.0 | 3.03 | 3.03 | 3.05 | 3.05 | 3.06 |
| Strawberry | 3.0 | 3.0 | 3.0 | 3.0 | 3.0 | 3.0 | 3.0 |
| Strawberry V* | 3.0 | 3.03 | 3.09 | 3.09 | 3.1 | 3.1 | 3.1 |

Agglomerate particles according to the invention which were loaded with the corresponding flavourings (production as described above) were compared with agglomerate particles which were produced by means of spray drying according to the standard method (V*).

The invention claimed is:

1. A device for the spray-drying agglomeration of particles, comprising
   (1) a chamber containing
      (i) in an upper region of the chamber a spray drying segment (A) in which a feed liquid atomizer (Z1) is placed and an inlet at the top of the spray drying segment (A) for spraying a slurry; and
      (ii) in a lower region of the chamber an integrated fluidized bed (B), said integrated fluidized bed (B) containing
         (a) a nozzle or atomizer construction (Z2) for spraying a binder liquid,
         (b) an outlet port (H) located at the bottom of a side wall of the integrated fluidized bed (B) and
         (c) a dam construction (G) located between the outlet port (H) and a zigzag classifier (P) for regulating the product amount,
   (2) the zigzag classifier (P) connected to the dam construction (G) and located outside of the lower region of the chamber, and
   (3) an external pathway connecting the zigzag classifier (P) and the inlet at the top of the spray drying segment (A) for returning fine dust.

2. The device of claim 1, wherein the nozzle or atomizer construction (Z2) in the internal fluidized bed (B) consists of a ring line, the nozzles or atomizers being evenly spaced along the ring line.

3. The device of claim 1, wherein the nozzle or atomizer construction (Z2) comprises at least 3 nozzles or atomizers.

4. The device of claim 3, wherein the nozzle or atomizer construction (Z2) comprises at least 4 nozzles or atomizers.

5. The device of claim 1, wherein the binder liquid from the nozzle or atomizer construction (Z2) in the internal fluidized bed is sprayed from the bottom to the top.

6. The device of claim 1, wherein the nozzles or atomizers in the nozzle or atomizer construction (Z2) are pressure-spray nozzles.

7. The device of claim 1, wherein the nozzles or atomizers in the nozzle or atomizer construction (Z2) are a twin-fluid spray nozzle.

8. The device of claim 1, wherein the input temperature at the feed atomizer is between 100° C. to 220° C. and the output temperature at the zigzag classifier (P) is from 20° C. to 100° C., with the slurry throughput being within the range of 300 to 1200 kg/hour, and being atomized at 30 to 200 bar.

9. The device of claim 1, wherein the temperature in the fluidized bed during agglomeration is between 5-90° C.

10. The device of claim 1 wherein the obtained spray-drying agglomeration of particles have a dust value of under 2.

11. The device of claim 1 wherein the obtained spray-drying agglomeration of particles have a particle size of larger than 600 μm.

12. The device of claim 1 wherein the fine dust is returned to the headspace of the spray drying segment (A).

* * * * *